United States Patent [19]
Cochrane et al.

[11] Patent Number: 5,513,788
[45] Date of Patent: May 7, 1996

[54] COVER FOR SPARE WHEEL

[76] Inventors: Dennis E. Cochrane, Box 83, Hamiota, Manitoba, Canada, R0M 0T0; Edward D. Brethour, P.O. Box 115, Hamiota, Manitoba, Canada

[21] Appl. No.: 356,135

[22] Filed: Dec. 15, 1994

[30] Foreign Application Priority Data

Dec. 17, 1993 [CA] Canada .................. 2111658

[51] Int. Cl.⁶ .................................. B62D 43/04
[52] U.S. Cl. .................. 224/42.23; 224/42.12; 224/42.2; 296/37.3; 414/463
[58] Field of Search .............. 224/42.12, 42.2, 224/42.23, 42.24, 42.25, 42.26, 42.18, 42.17, 42.22, 42.15; 296/37.2, 37.3; 414/463

[56] References Cited

U.S. PATENT DOCUMENTS

| | | | |
|---|---|---|---|
| 2,117,049 | 5/1938 | Widman et al. | 296/37.2 |
| 3,372,821 | 3/1968 | Podhajsky | 414/463 |
| 3,542,413 | 11/1970 | Hardison | 414/463 |
| 4,059,197 | 11/1977 | Iida | 414/463 |
| 4,377,366 | 3/1983 | Hamlyn | 224/42.23 |
| 4,693,453 | 9/1987 | Ivan | 414/463 |
| 4,915,358 | 4/1990 | Stallings | 224/42.23 |

FOREIGN PATENT DOCUMENTS

| | | | |
|---|---|---|---|
| 57955 | 1/1982 | Japan | 224/42.23 |
| 1435207 | 5/1976 | United Kingdom | 224/42.23 |
| 2081657 | 2/1982 | United Kingdom | 224/42.2 |

*Primary Examiner*—Henry J. Recla
*Assistant Examiner*—Gregory M. Vidovich
*Attorney, Agent, or Firm*—Adrian D. Battison; Murray E. Thrift

[57] ABSTRACT

A cover for a spare tire for use with light duty trucks and the like where spare tires are carried under the body of the vehicle exposed to the outside environment. The cover is designed to protect the spare tire and rim from becoming filled with foreign material. The cover is placed on the spare tire between the spare tire and the underside of the body of the vehicle preventing foreign material from entering the spare tire and rim from the topside.

13 Claims, 3 Drawing Sheets

COVER FOR SPARE WHEEL

FIELD OF THE INVENTION

This invention relates to a cover for a spare wheel for use with light duty trucks and the like where spare wheels are carried under the body of the vehicle exposed to the outside environment.

BACKGROUND OF THE INVENTION

Spare wheels that are carried under the bodies of light duty trucks can become filled with foreign material such as gravel, mud, snow, and ice, etc. When the spare wheel is removed for use, the person changing the tire has to first clean the foreign material out of the top of the spare wheel before the spare wheel can be mounted on the truck. This requires additional time spent in changing the tire which is inconvenient and can be hazardous if the individual changing the tire is doing so on a busy highway, or in sub-zero temperatures.

A cover for a spare wheel is needed which protects the spare wheel from becoming filled with foreign material thereby reducing the time needed for changing the spare wheel and resulting in greater convenience and safety for the individual performing the task.

SUMMARY OF THE INVENTION

It is one object of the present invention, therefore, to provide a cover for a spare wheel which protects the spare wheel from becoming filled with foreign material thereby reducing the time needed for changing the spare wheel resulting in greater convenience and safety for the individual performing the task.

According to the present invention there is provided a vehicle comprising; a body including an underside of the body; a spare wheel including a wheel and a tire, the wheel having a rim and a bolt plate fixed to the rim coaxial to and surrounded by said rim, the tire being arranged around the periphery of the rim; suspension means for storage of the spare wheel arranged adjacent the underside of the body such that the spare wheel is exposed to the outside environment; a cover for the spare wheel including a rigid circular plate positioned coaxial and adjacent the spare wheel, and an annular rim arranged around a peripheral edge of said circular plate for engaging an outer surface of the spare wheel; wherein the circular plate has a center, and an outer surface and wherein the outer surface slopes downwards and radially outwards from said center, and wherein the annular rim comprises a flange sloping downwards and outwards from the outside surface of the circular plate to a peripheral edge such that an inner surface of the annular rim engages the periphery of the tire thereby holding the circular plate in place on the tire, and wherein the circular plate and annular rim are symmetrical in cross section about any radial axis, and wherein the circular plate includes a hole located at the center.

Preferably the circular plate includes a removable and reengageable center plug to fill the center hole.

Alternatively the hole includes a sealing gasket to accommodate a winch body.

Preferably the cover is arranged between the underside of the body and the spare wheel.

One embodiment of the invention will now be described in conjunction with the accompanying drawings in which:

DESCRIPTION OF THE DRAWINGS

In the drawings like characters of reference indicate corresponding parts in the different figures.

DETAILED DESCRIPTION

Figure 1:
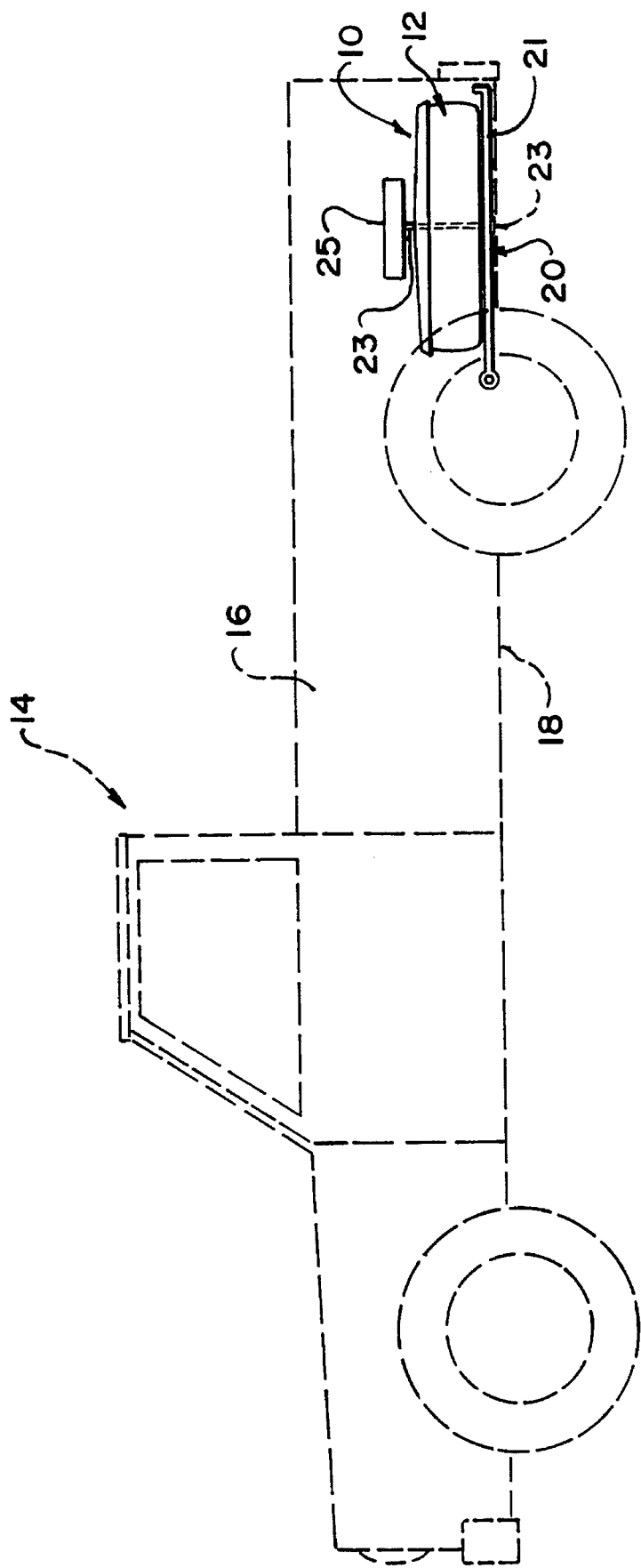
FIG. 1 is a side view of the cover for the spare wheel mounted on a truck.

Referring to FIG. 1 the cover 10 for a spare tire is shown positioned on the spare wheel 12, with the spare wheel 12 stowed on a light duty truck 14.

The truck 14 has a body 16 and an underside 18 of the body 16. Connected to the under side 18 of the body 16 are suspension means 20 for stowing the spare wheel 12 when not in use. The suspension means 20 are arranged adjacent the underside 18 of the body 16 and support the spare wheel 12 beneath the truck with the spare tire 12 exposed to the outside environment.

In one embodiment the suspension means 20 comprise a support structure 21 which is pivotally connected to the underside 18 of the truck 14 at one end, and which is free to move at the other end. A cable 23 is fixed at one of its ends to the support structure 21 and is connected at its other end to a winch 25. The winch 25 raises and lowers the cable 23 and thereby the support structure 21 allowing the operator to place the spare wheel 12 on the support structure 21 and raise it into the stowed position.

In an alternative embodiment the support structure 21 is not movable and is fixed to the underside 18 of the truck 14. The spare wheel 12 is raised up by hand and placed on the support structure 21 for stowage when not in use.

Figure 5:
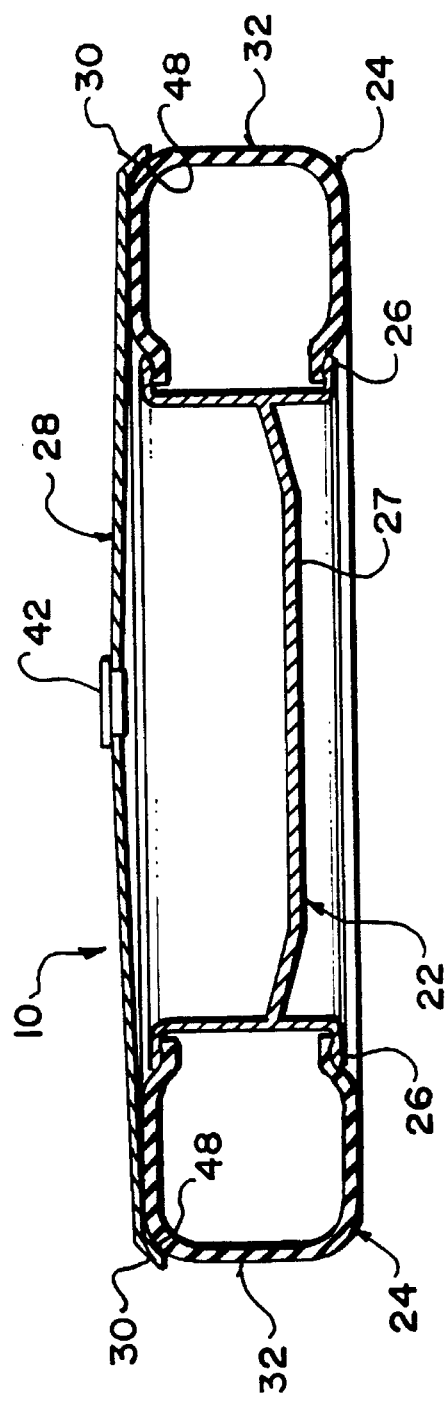
FIG. 5 is a cross sectional side view showing the cover for the spare tire in place on a spare wheel through line 5—5.

Referring to FIG. 5 the spare wheel 12 includes a wheel 22 and a tire 24. The wheel 22 has a rim 26 and a bolt plate 27. The bolt plate 27 is fixed to the rim 26 coaxial to and surrounded by the rim. The tire 24 is arranged around the periphery of the wheel 22.

Figure 2:
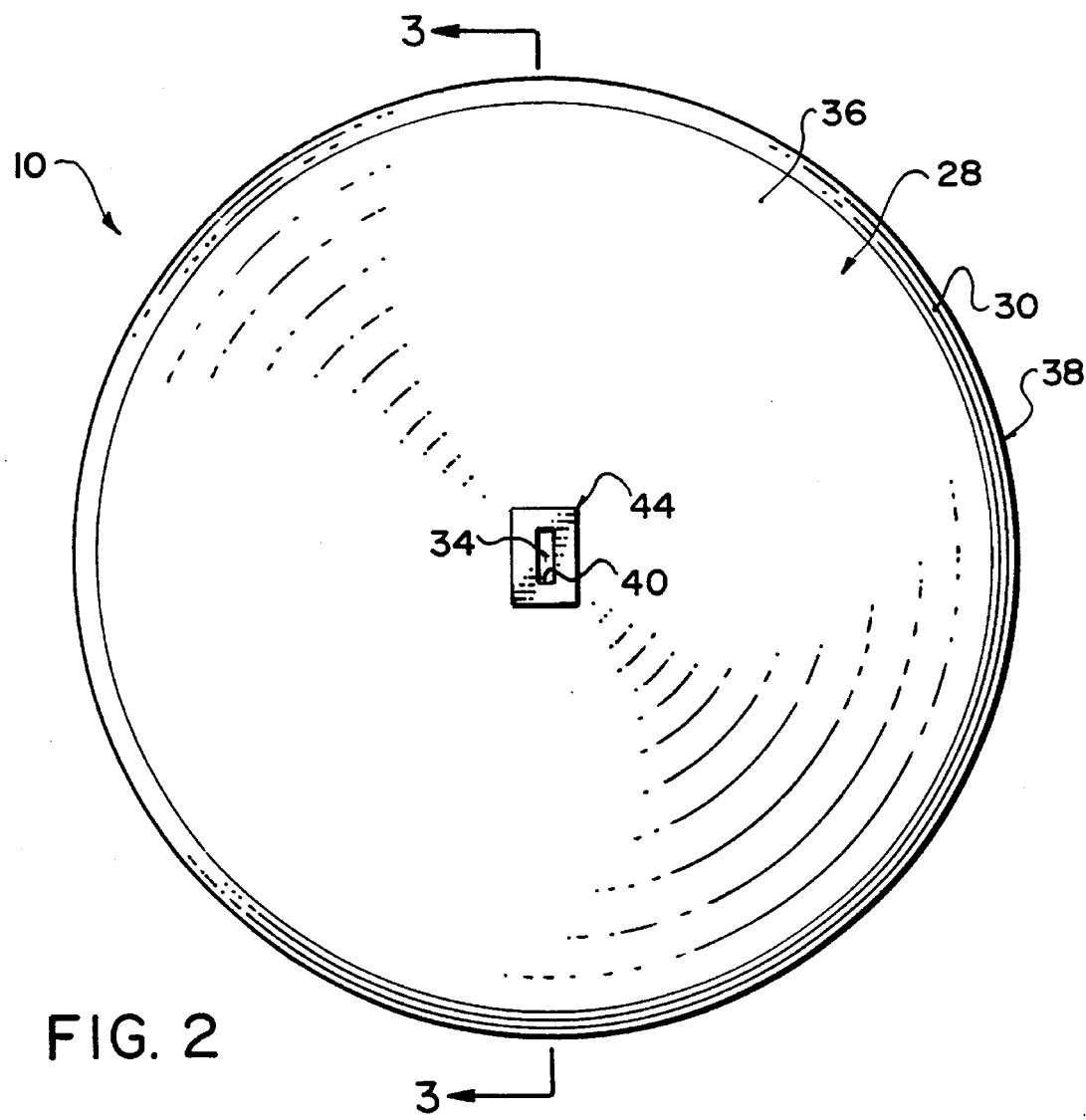
FIG. 2 is a top view of the cover for the spare wheel.
Figure 3:
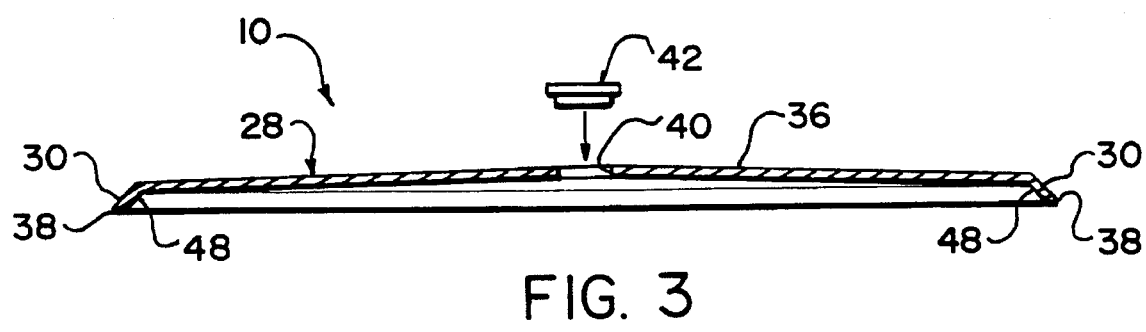
FIG. 3 is a cross sectional side view of the cover for the spare wheel through line 3—3.
Figure 4:
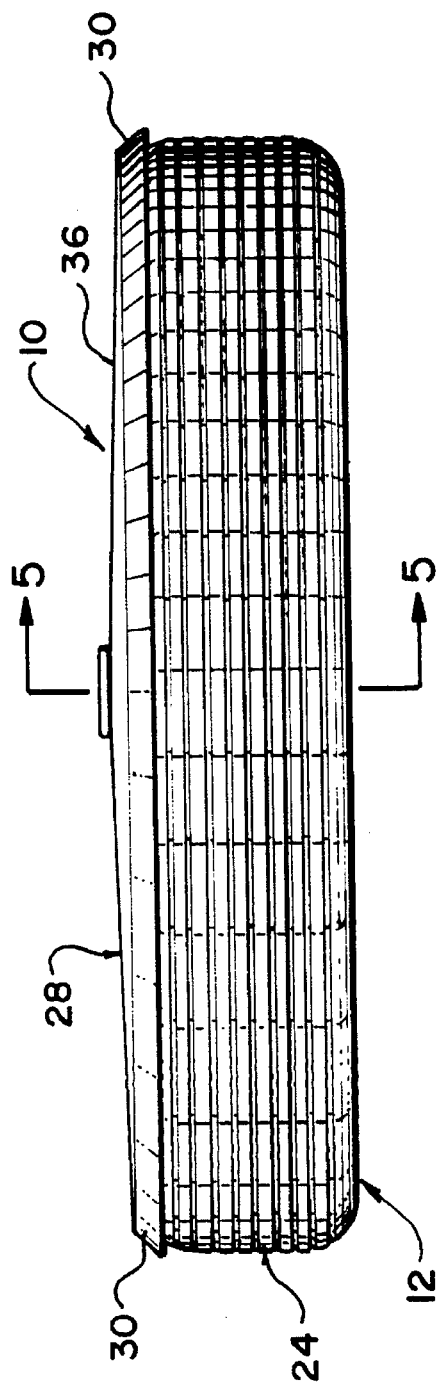
FIG. 4 is a side view showing the cover for the spare wheel in place on a spare wheel.

Referring to FIGS. 2, 3, and 4 the cover 10 for the spare wheel 12 comprises a rigid circular plate 28 positioned coaxial and adjacent the spare wheel 12, and an annular rim 30 arranged around a peripheral edge of the circular plate 28.

The circular plate 28 has a centre 34, and an outer surface 36 The outer surface 36 slopes downwards and radially outwards from the center 34 so that when installed on the spare tire the center of the cover is above the annular rim 30 of the cover.

The circular plate 28 includes a hole 40 located at the center 34 to allow the cable 23 to pass through the center of the circular plate in embodiments where a winch 25 is used to raise and lower the suspension means 20.

A removable and reengageable centre plug 42 is located in the centre hole 40. The plug 42 can be removed to accommodate the winch 25 body and cable 23. The hole 40 also includes a sealing gasket 44 to engage the winch 25 body thereby preventing foreign material from entering the spare wheel 12 via the center hole 40 when the plug 42 has been removed.

The annular rim 30 comprises a flange sloping downwards and outwards from the outside surface 36 of the circular plate 28 to a peripheral edge 38 such that the annular rim 30 and circular plate 28 are symmetrical in cross section about any radial axis. An inner surface 48 of the annular rim 30 engages a peripheral outer surface 32 of the spare wheel 12 holding the circular plate 28 in place on the spare wheel 12.

In use the cover is positioned on the spare tire with the inner surface 48 annular rim 30 engaging the peripheral outer surface 32 of the spare wheel 12. The annular rim 30 centers and holds the circular plate 28 in place on the spare wheel 12. The plug 42 is removed from the cover 10 and the wheel 12 and cover 10 are placed on the supporting structure 21 of the suspension means 20 arranged so that the cover 10 will lie between the underside 18 of the body 16 and the spare wheel 12 when the supporting structure 21 is in the raised position. The cable 23 is placed through the hole 40 in the cover 10 and fixed to the supporting structure 21 and the supporting structure 21 is raised into place by the winch 25 and secured.

When the spare wheel 12 is needed the tire 12 is lowered from under the truck 14 and the cover 10 is removed and the spare 12 is mounted on the truck 14.

In a second alternative embodiment the vehicle does not include a supporting structure 21. In this case the cable 23 is connected at one of its ends directly to the bolt plate 27 of wheel 22 and is connected at its other end to a winch 25. The cable therefore acts as the suspension means for the spare wheel 12. The winch 25 raises and lowers the cable 23 and thereby raises and lowers the spare wheel 12.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A vehicle comprising;
   a body including an underside of the body; a spare wheel including a wheel member and a tire all having top and bottom sides relative to the underside of the body the wheel member having a rim and a bolt plate fixed to the rim coaxial to and surrounded by said rim, the tire being arranged around the periphery of the rim;
   suspension means for storage of the spare wheel arranged adjacent the underside of the body such that the bottom side of the spare wheel is exposed to the outside environment; a cover for the spare wheel arranged between the underside of the body and the spare wheel, said cover including a rigid circular plate positioned coaxial to and adjacent the top side of the spare wheel, having an annular rim arranged wholly around a peripheral edge of said circular plate for engaging an outer surface of the tire proximate the periphery thereof such that the cover encloses the top sides of the tire, wheel member, and rim thereby preventing the accumulation of debris therein; and
   wherein the cover consists solely of the circular plate, said circular plate being separate from the body of the vehicle and loose such that the cover can be easily placed upon the spare wheel and removed therefrom.

2. A vehicle in accordance with claim 1 wherein the circular plate has a center, and an outer surface and wherein the outer surface slopes downwards and radially outwards from said center.

3. A vehicle in accordance with claim 2 wherein the annular rim comprises a flange sloping downwards and outwards from the outside surface of the circular plate to a peripheral edge such that an inner surface of the annular rim engages the periphery of the tire thereby holding the circular plate in place on the tire.

4. A vehicle in accordance with claim 2 wherein the circular plate includes a hole at the center.

5. A vehicle in accordance with claim 4 wherein the circular plate includes a removable and reengageable center plug to fill the center hole.

6. A vehicle in accordance with claim 4 wherein the hole includes a sealing gasket to accommodate a winch body.

7. A vehicle comprising;
   a body including an underside of the body; a spare wheel including a wheel member and a tire, the wheel member having a rim and a bolt plate fixed to the rim coaxial to and surrounded by said rim, the tire being arranged around the periphery of the rim; suspension means for storage of the spare wheel arranged adjacent the underside of the body such that the spare wheel is exposed to the outside environment; a cover for the spare wheel including a rigid circular plate positioned coaxial to and adjacent the spare wheel, and an annular rim arranged around a peripheral edge of said circular plate for engaging an outer surface of the tire; wherein the circular plate has a center, and an outer surface and wherein the outer surface slopes downwards and radially outwards from said center, and wherein the annular rim comprises a flange sloping downwards and outwards from the outside surface of the circular plate to a peripheral edge such that an inner surface of the annular rim engages the periphery of the tire thereby holding the circular plate in place on the tire, and wherein the circular plate includes a hole located at the center, and wherein the circular plate includes a removable and reengageable center plug to fill the center hole.

8. A vehicle in accordance with claim 7 wherein the hole includes a sealing gasket to accommodate a winch body.

9. A vehicle in accordance with claim 8 wherein the cover is arranged between the underside of the body and the spare wheel.

10. A vehicle in accordance with claim 9 wherein the cover is free from connection to the underside of the body.

11. A vehicle in accordance with claim 7 wherein the cover is arranged between the underside of the body and the spare wheel.

12. A vehicle in accordance with claim 11 wherein the cover is free from connection to the underside of the body.

13. A vehicle in accordance with claim 7 wherein the circular plate is separate from the body of the vehicle and loose such that the cover can be easily placed upon the spare wheel and removed therefrom.

* * * * *